G. F. BUSH.
WEED CUTTING CULTIVATOR.
APPLICATION FILED MAY 17, 1915.

1,159,568.

Patented Nov. 9, 1915.

Inventor

GEORGE F. BUSH

By Shigley & Harney
Attorneys

UNITED STATES PATENT OFFICE.

GEORGE F. BUSH, OF BIDWELL, OHIO.

WEED-CUTTING CULTIVATOR.

1,159,568.    Specification of Letters Patent.    Patented Nov. 9, 1915.

Application filed May 17, 1915. Serial No. 28,723.

*To all whom it may concern:*

Be it known that I, GEORGE F. BUSH, a citizen of the United States of America, residing at Bidwell, in the county of Gallia and State of Ohio, have invented certain new and useful Improvements in Weed-Cutting Cultivators, of which the following is a specification.

The present invention relates to improvements in weed cutting cultivators or an attachment for cultivators, and is designed to provide the cultivator with a weed cutting attachment so that the weeds may be cut down as the implement is drawn over the ground to cultivate the soil.

The primary object of the invention is the provision of a combined cultivator and weed cutter which is adjustable for cutting various widths of swaths of weeds and various widths for the travel of the teeth or plows of the cultivator.

The invention consists essentially in certain novel combinations and arrangements of parts whereby the implement may be increased or diminished in width and held in adjusted position, as will be pointed out hereinafter and set forth in the claims.

In the accompanying drawings I have illustrated one complete example of the physical embodiment of my invention constructed according to the best mode I have so far devised for the practical application of the principles of my invention.

Figure 1:
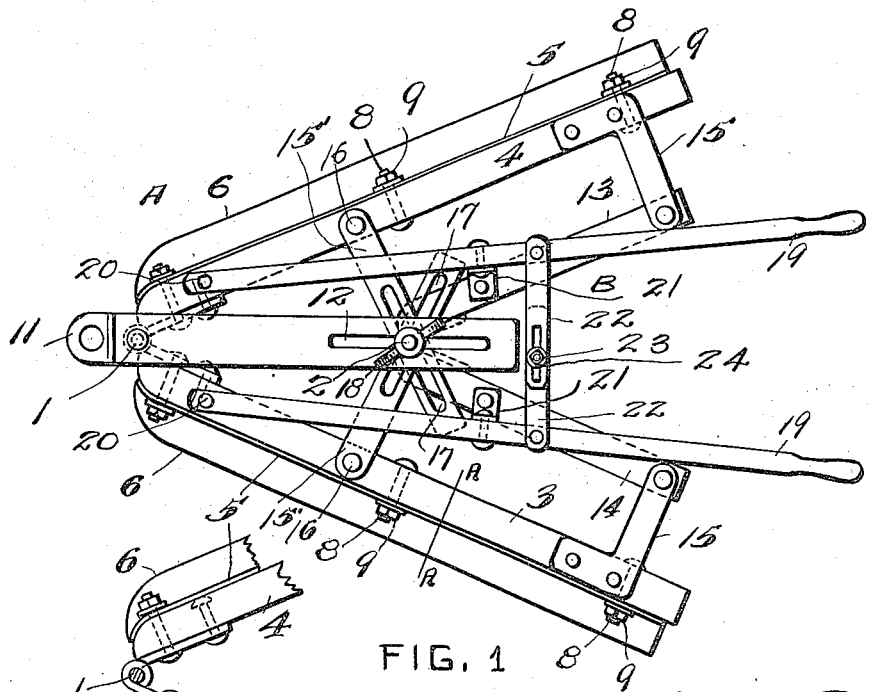
Figure 3:
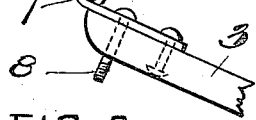
Figure 2:
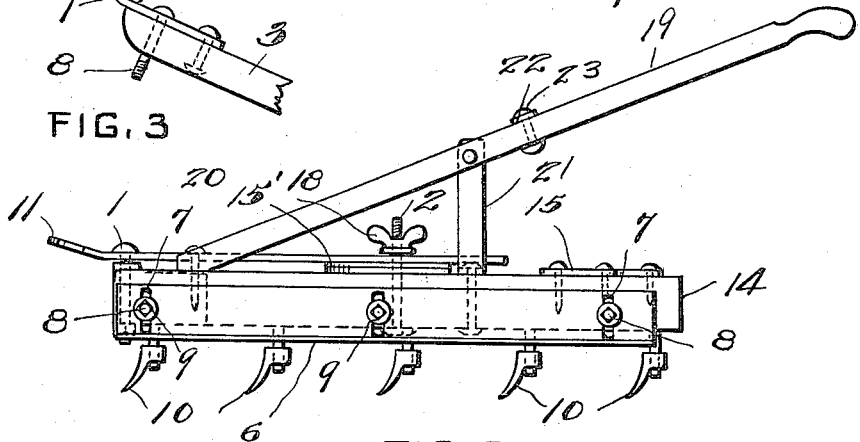
Figure 4:
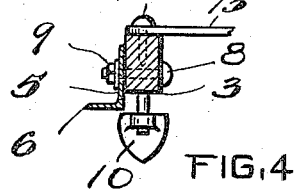

Figure 1 is a top plan view of the complete implement embodying my invention. Fig. 2 is a side elevation of the implement. Fig. 3 is a detail view of the hinge joint of the main frame. Fig. 4 is a sectional view on line A—A Fig. 1.

In the preferred embodiment of my invention as shown in the drawings I have illustrated two hinged frames as A and B, the former hinged at 1 and the latter at 2. The frame A comprises two wooden beams 3 and 4 joined by the hinge 1, and each of these beams is equipped with an angle plate as 5 which is fashioned with a cutting edge 6 lying parallel with the surface over which the implement is to be drawn. These angle plates or cutting blades are the weed cutters, and they are adjustable as to height on the beams 3 and 4 by means of the slots 7 in the plates and the bolts 8 and nuts 9, said bolts passing therethrough and through the beams 3 and 4. Thus the cutting blades may be adjusted as to height for cutting the weeds or other stalks with relation to the ground line and with relation to the depth at which the cultivator teeth 10, carried by the cultivator, dig into the soil. The teeth or shovels 10 are of suitable or approved type and perform the usual functions of such devices, and are carried by both the outer frame A and the inner frame B of the cultivator.

The implement is to be drawn over the ground by power attached to the perforated tongue 11 which is a metal plate, perforated for the accommodation of the hinge bolt 1, and slotted at 12 for the reception of the hinge bolt 2 of the inner frame B. This tongue, it will be noted retains its longitudinal alinement at all times, but the beams 3 and 4 of the frame A and the beams 13 and 14 of the frame B may be swung on their hinge joints to bring them to various angles with relation to the tongue. The two beams 13 and 14 while they are equipped with the teeth 10, it will be apparent they have no need for the weed cutting blades, and therefore the blades are omitted.

At the rear the two frames A and B are connected by a pair of angle brackets 15 which are rigidly bolted to the beams 3 and 4, but may be pivoted by a single bolt to the beams 13 and 14. The front or hinged end of the inner frame is connected to the beams of the outer frame by the slotted plates 15', 15', pivoted at 16 and at the other end formed with slots 17 through which the bolt 2 passes. The bolt which is the hinge bolt for the inner frame projects upwardly, through the two slotted plates and the slotted tongue, and a nut 18 clamps the parts together.

The two handle bars 19 of the implement are rigidly attached at 20 to the outer frame, and are loosely attached to the inner frame beams by angle brackets 21, 21, in order to permit necessary movement of the handle bars when the divergence of the frame beam is changed. A pair of slotted straps 22 join the handle bars and the clamp bolt 23 holds the straps in adjusted position so that these straps serve to brace and rigidly hold the handle bars when once adjusted.

From this description it will be apparent that the angle of divergence of the two pairs of beams of the two frames A and B may be adjusted with relation to the line of the tongue 11, or to the direction of travel of the implement in a simple manner by first loosening the nuts 18 on the bolt 2 and 24 on the bolt 23. With these connections thus loosened the beams of the frames may be spread farther apart on their hinge bolts, or swung closer together as desired, the slotted straps and plates allowing of the required movements. When the desired adjustment is reached the parts are clamped together by means of the nuts 18 and 24 as will be understood. While I have illustrated the frame portions of wood bars, it will be understood that the frame may be made up of metal channel bars or angle irons when desired.

From the above description it will be apparent, when taken in connection with my drawings, that I have provided an exceptionally efficient implement of the type set forth for cutting weeds and "mulching" the top of the soil as the cultivating process goes forward, and the implement leaves the cultivated soil level and smooth.

What I claim is:—

1. The combination with an inner hinged frame and an outer hinged frame each comprising diverging beams, and adjusting devices connecting said frames, of cutting blades carried by said outer frame as described.

2. The combination with a stationary tongue, and an inner hinged frame and an outer hinged frame each comprising diverging beams adjusting devices connecting the frames, and cutting blades carried by said outer frame.

3. The combination with a stationary slotted tongue of an inner frame and an outer frame hinged to said tongue and comprising diverging beams, means connecting the frames for changing the divergence of the beams, and cutting blades carried by said outer frame.

4. The combination with a stationary slotted tongue of an inner frame and an outer frame hinged to said tongue and comprising diverging beams, slotted brace plates pivoted to the outer frame and connected with said tongue and the hinge joint of the inner frame, and cutting blades carried by the outer frame.

In testimony whereof I affix my signature.

GEORGE F. BUSH.

Copies of this patent may be obtained for five cents each, by addressing the "Commissioner of Patents, Washington, D. C."